United States Patent
Tseng et al.

(10) Patent No.: US 6,263,787 B1
(45) Date of Patent: Jul. 24, 2001

(54) THERMAL COOKER

(76) Inventors: Rong-Yuan Tseng, 10F, No. 3, Lane 65, Sec. 2, Chung Hsiao Rd.; I-Kuo Ling, 9F, No. 12, Alley 31, Lane 105, Sec. 2, Chung Hsiao Rd., both of San Chorng City, Taipei Hsien; Wang-Sung Tseng, 3Fl., No. 76, Kuen Yang Street, Taipei, all of (TW)

( * ) Notice: Subject to any disclaimer, the term of this patent is extended or adjusted under 35 U.S.C. 154(b) by 0 days.

(21) Appl. No.: 09/729,969

(22) Filed: Dec. 6, 2000

(51) Int. Cl.⁷ .............................. A23L 1/00; A47J 27/00; A47J 27/06; A47J 37/00; H05B 1/02
(52) U.S. Cl. .................. 99/413; 99/340; 99/403; 99/448; 126/369; 126/373.1; 220/912
(58) Field of Search .................. 99/337, 338, 403–418, 99/444–450, 339, 340, 483; 126/369, 373.1, 377.1; 219/492, 494, 497, 401, 501; 220/592, 246, 315, 393, 486, 489, 314, 316, 912; 426/509–511, 520, 523

(56) References Cited

U.S. PATENT DOCUMENTS

| | | | |
|---|---|---|---|
| Re. 16,011 | * 3/1925 | Simon | 99/412 |
| 899,244 | * 9/1908 | Chase | 99/412 |
| 1,214,992 | * 2/1917 | Boleratz | 99/412 |
| 2,081,751 | * 5/1937 | Lendrum et al. | 99/412 |
| 3,808,963 | * 5/1974 | Ludena | 99/417 |
| 4,164,174 | * 8/1979 | Wallsten | 99/415 |
| 4,401,017 | * 8/1983 | Feld | 99/413 |
| 4,462,308 | * 7/1984 | Wang | 126/369 X |
| 4,604,989 | * 8/1986 | Kita | 126/377 X |
| 4,739,698 | * 4/1988 | Allaire | 99/417 |
| 5,287,798 | * 2/1994 | Tkaeda | 99/413 |
| 5,584,235 | * 12/1996 | DuBois et al. | 126/369 X |
| 5,816,139 | * 10/1998 | Scorta Paci | 99/410 X |

* cited by examiner

Primary Examiner—Timothy F. Simone
(74) Attorney, Agent, or Firm—Rosenberg, Klein & Lee

(57) ABSTRACT

A thermal cooker having high insulating efficiency and capable of boiling and smothering food is provided. A thermal storage ring is connected to an outer bottom surface of an inner pot of the thermal cooker to be heated along with food in the inner pot until the food is boiled. The inner pot with boiled food and heated and glowing thermal storage ring is then positioned into an outer pot and closed with inner and outer lids, so that food in the inner pot is kept boiling with heat released from the thermal storage ring and then be smothered in the thermal cooker for a period of time.

4 Claims, 4 Drawing Sheets

THERMAL COOKER

BACKGROUND OF THE INVENTION

The present invention relates to a cooker having high insulating efficiency and capable of boiling and smothering food, and more particularly to a thermal cooker that includes an inner pot having a thermal storage ring connected to an outer bottom surface and an outer pot for receiving the inner pot therein. The inner pot with the thermal storage ring is heated to boil food and juice contained therein and then positioned into the outer pot, so that food and juice in the inner pot is kept boiling with heat released from the thermal storage ring and then be smothered for a period time.

It is a common cooking manner in Chinese food preparation to boil food in a pot or saucepan and then simmer the food gently to produce a delicious dish. A disadvantage of this type of cooking manner is it takes a lot of time and thermal energy to cook. To reduce the time and thermal energy needed in cooking food, there is a thermal cooker developed and available in the market. FIG. 4 is a schematic sectional view of the currently available thermal cooker A. As shown, the thermal cooker A includes an outer pot A1 containing insulating material, such as polylone, foamed plastics, etc., and an inner pot A2 adapted to be positioned in the outer pot and closed with an inner lid. Food is first boiled in the inner pot A2. The inner pot A2 with the boiled food is then positioned into the outer pot A1 that is in turn closed with an outer lid, so that food in the inner pot A2 is kept smothered in the thermal cooked for a period of time with the heat in the boiled food without using other external heat source. Thermal energy needed to cook food is therefore reduced. However, such conventional thermal cooker does not boil food but only smother food that has been previously boiled outside the thermal cooker, and boiled food smothered in the thermal cooker usually does not taste perfectly.

SUMMARY OF THE INVENTION

It is therefore a primary object of the present invention to provide a thermal cooker capable of boiling and smothering food to produce perfectly delicious food at reduced thermal energy.

To achieve the above and other objects, the thermal cooker of the present invention mainly includes an inner pot having a thermal storage ring connected to an outer bottom surface and an outer pot for receiving the inner pot therein. When the inner pot of the thermal cooker is heated to boil food therein with an external heat source, the thermal storage ring is heated to glow at the same time and thereby store a large amount of heat. The inner pot with the boiled food and the glowing thermal storage ring is then positioned into the outer pot and closed with inner and outer lids. At this point, the thermal storage ring releases heat stored therein to keep boiling food in the inner pot for a period of time before the boiled food is smothered in the thermal cooker with heat in the inner pot.

The thermal storage ring is also adapted to use with other types of cookware, particularly various types of flat-bottomed pans. The thermal storage ring provided near a bottom of the cookware tend to concentrate flames to prevent them from stretching outward and enables complete combustion of gas and accordingly safe use of gas stove and reduced consumption of thermal energy.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
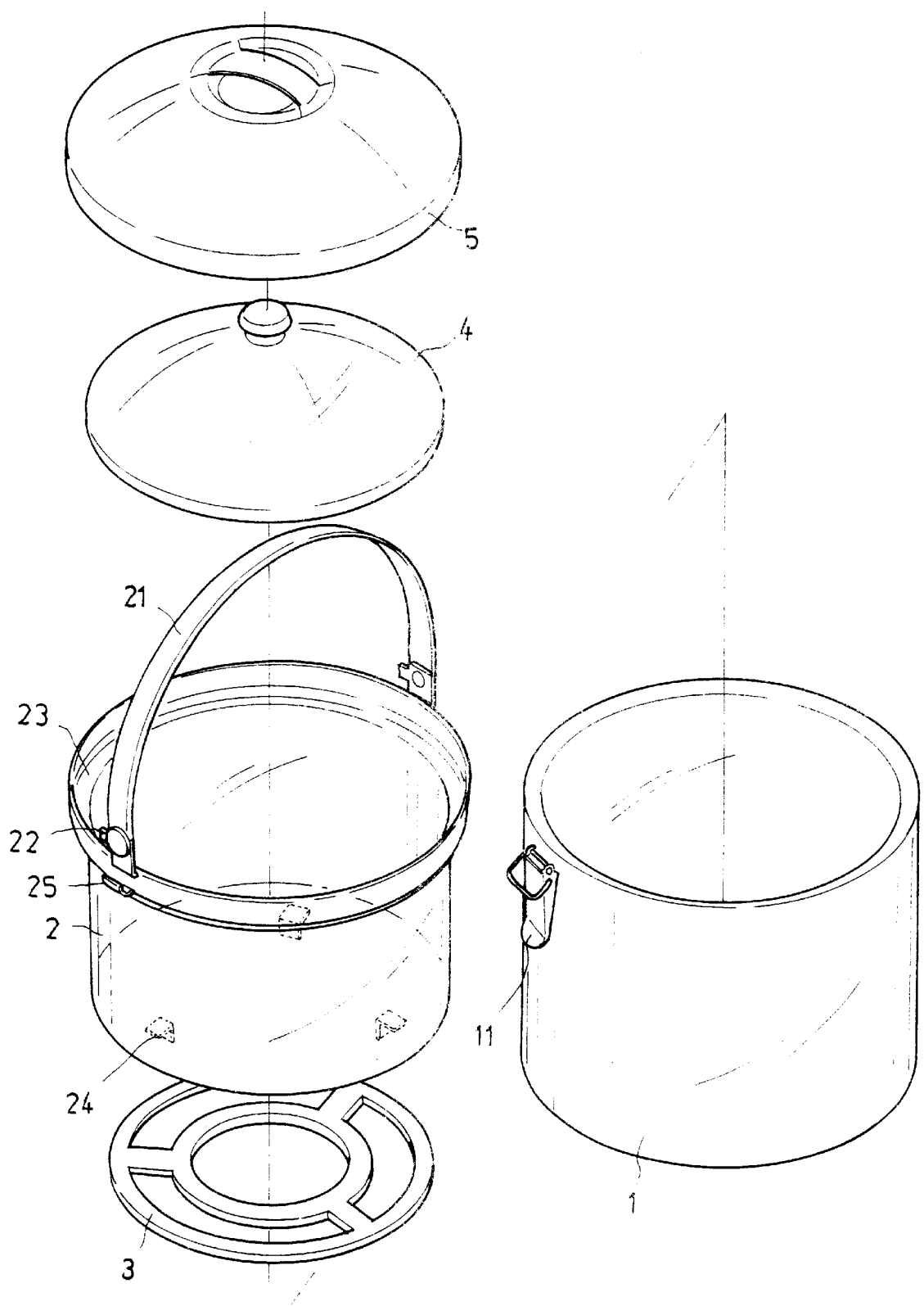
FIG. 1 is an exploded perspective of a thermal cooker according to the present invention.
Figure 2:
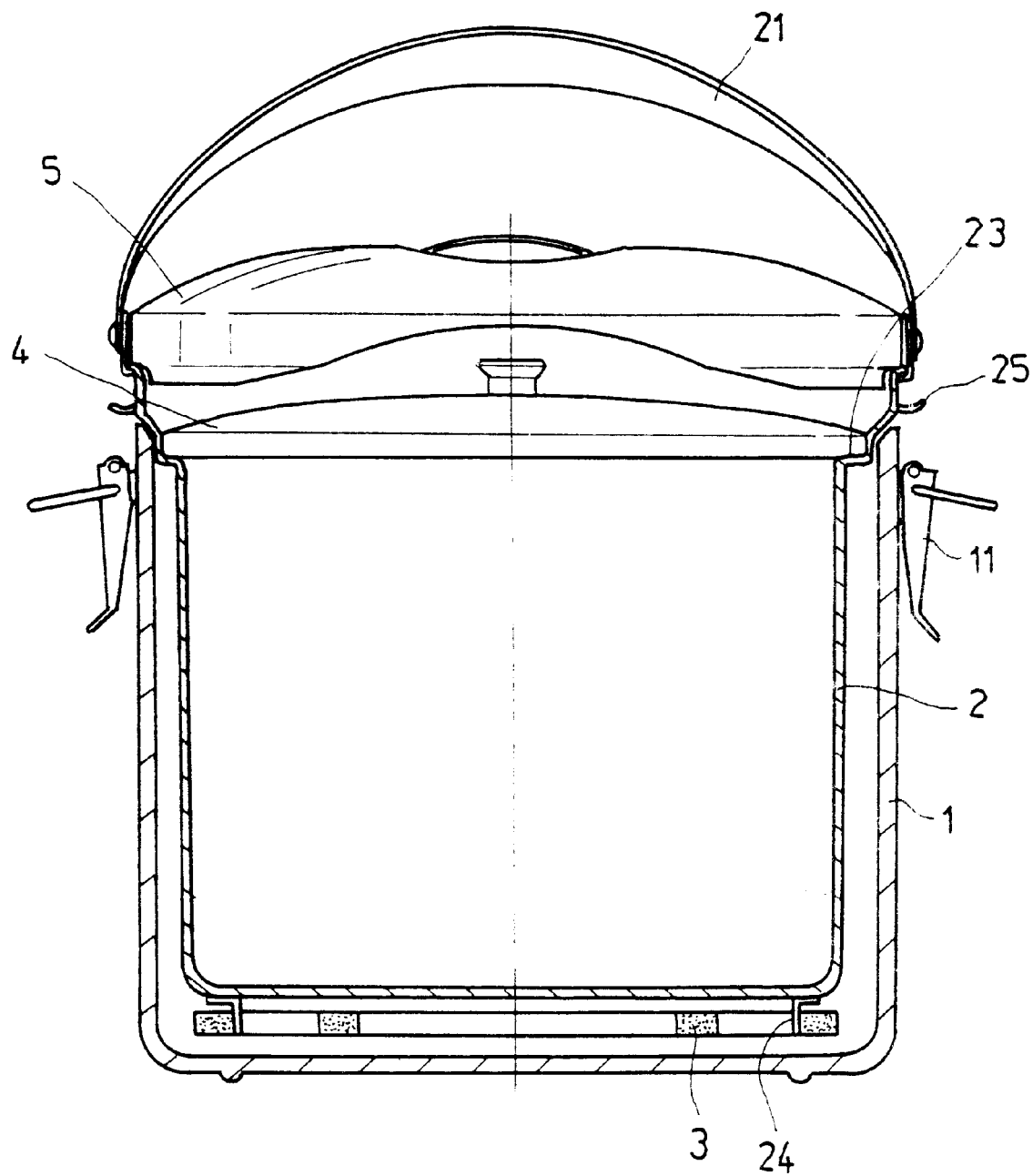
FIG. 2 is an assembled sectional view of the thermal cooker of FIG. 1.

Please refer to FIGS. 1 and 2 that are exploded perspective and assembled sectional views, respectively, of a thermal cooker according to the present invention. As shown, the thermal cooker mainly includes an outer pot 1 and an inner pot 2 adapted to position in the outer pot 1.

The outer pot 1 is provided on an outer wall surface close to a top opening thereof with two diametrically opposite buckles 11.

The inner pot 2 is provided close to an upper rim 23 thereof with a handle 21 for conveniently carrying the inner pot 2. The handle 21 is provided at two ends with two projections 22 to enable the handle 21 to stably cross over the inner pot 2. The upper rim 23 of the inner pot 2 is diametrically expanded such that, when the inner pot 2 is positioned into the outer pot 1, the inner pot 2 is suspended in the outer pot 1 with a middle outer side of the expanded upper rim 23 supported on a top rim of the outer pot 1. The inner pot 2 is also provided on an outer wall surface slightly below the two ends of the handle 21 with two hook plates 25 corresponding to the two buckles 11. By connecting the buckles 11 to the hook plates 25, the inner pot 2 is firmly held in the outer pot 1. A plurality of fixing members 24 are connected to an outer bottom surface of the inner pot 2 for holding a thermal storage ring 3 below the inner pot 2 with a predetermined clearance existed between the bottom of the inner pot 2 and the thermal storage ring 2. The clearance is preferable from 0.5 cm to 1.5 cm.

An inner lid 4 is removably seated on a lower inner side of the expanded top rim 23 to close the inner pot 2. And, an outer lid 5 is removably seated on a topmost edge of the top rim 23 to locate over the inner lid 4 and close the inner pot 2, too.

To use the thermal cooker of the present invention to cook food, first connect the thermal storage ring 3 to the fixing members 24 below the bottom of the inner pot 2, and then heat the inner pot 2 and the thermal storage ring 3 at the same time. When the food positioned in the inner pot 2 is boiled, the thermal storage ring 3 is also heated to glow and stores a large amount of heat therein. Then, position the inner pot 2 into the outer pot 1 and connect the buckles 11 to the hook plates 25 to firmly hold the inner pot 2 in the outer pot 1, and then sequentially close the inner lid 4 and the outer lid 5 onto the top rim 23 of the inner pot 2. At this point, the thermal storage ring 3 at the bottom of the inner pot 2 starts releasing thermal energy stored therein. Thermal energy continuously released from the thermal storage ring 3 keeps boiling the food in the inner pot 2 until all the stored thermal energy has been released from the thermal storage ring 3. In a preferred embodiment of the present invention, the thermal storage ring 3 is capable of releasing stored thermal energy for about 20 to 30 minutes. That is, the thermal cooker of the present invention is capable of keeping boiling food for a period of time and then smothering food in the closed inner pot 2 to produce perfectly delicious food without using external heat source and therefore enables reduced consumption of thermal energy.

Figure 3:
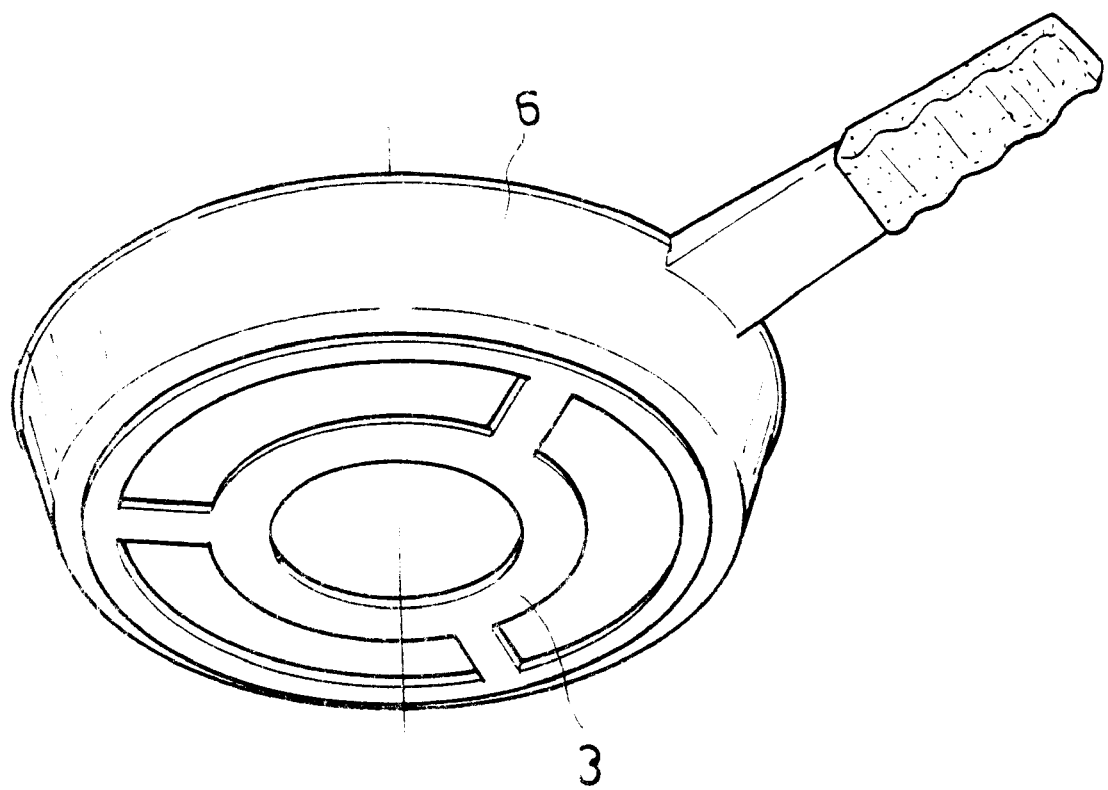
FIG. 3 is a bottom perspective view of a flat-bottomed pan with a thermal storage ring of the present invention closely provided at a bottom of the pan.
Figure 4:
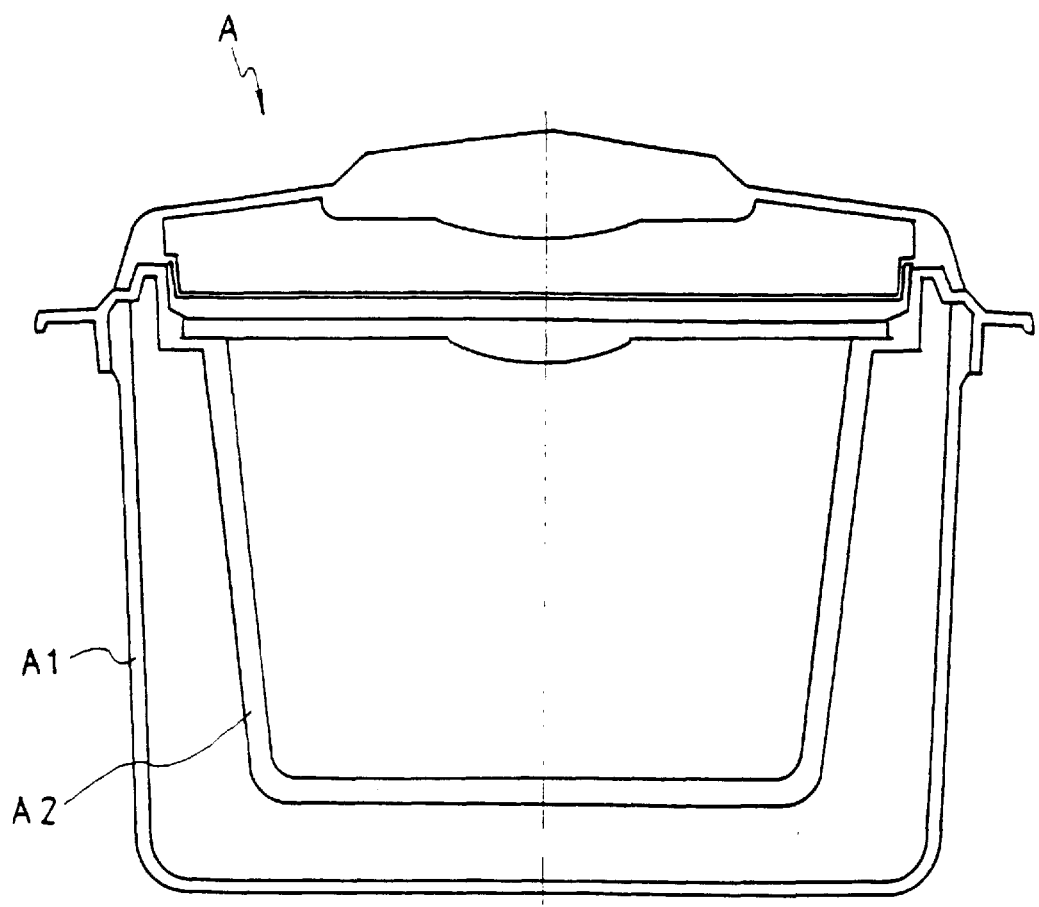
FIG. 4 is a schematic sectional view of a conventional thermal cooker.

The thermal storage ring 3 of the present invention may also be used with other types of cookware, particularly various kinds of flat-bottomed pans 6, as shown in FIG. 3. When a cookware with the thermal storage ring 3 is heated over a gas stove, flames tend to concentrate at the thermal storage ring 3 without becomingly widely stretched. Since the thermal storage ring 3 generates high thermal energy, it enables complete combustion of gas and is therefore helpful in energy saving and safe use of gas stove.

What is claimed is:

1. A thermal cooker capable of boiling and smothering food, comprising:

an outer pot being provided on an outer wall surface close to a top opening thereof with two diametrically opposite buckles;

an inner pot adapted to position in said outer pot and being provided close to an upper rim thereof with a handle for conveniently carrying said inner pot, said handle being provided at two ends with two projections to enable said handle to stable cross over said inner pot, said upper rim of said inner pot being diametrically expanded such that, when said inner pot is positioned into said outer pot, said inner pot is suspended in said outer pot with a middle outer side of said expanded upper rim supported on a top rim of said outer pot, said inner pot being also provided on an outer wall surface slightly below the two ends of said handle with two hook plates corresponding to said two buckles on said outer pot, such that said inner pot is firmly held in said outer pot by connecting said buckles to said hook plates;

an inner lid removably seated on a lower inner side of said expanded top rim of said inner pot to close said inner pot; and an outer lid removably seated on a topmost edge of said top rim of said inner pot to locate over said inner lid and close said inner pot; and said thermal cooker being characterized in that said inner pot is provided at an outer bottom surface with a plurality of fixing members for holding a thermal storage ring to the outer bottom surface of said inner pot with a predetermined clearance existed between the bottom of said inner pot and said thermal storage ring.

2. A thermal cooker capable of boiling and smothering food as claimed in claim 1, wherein said thermal storage ring is adapted to use with flat-bottomed pans, skillets, etc. to concentrate flames produced by a gas stove and prevent said flames from widely stretching outward and thereby enables complete combustion of gas and energy saving.

3. A thermal cooker capable of boiling and smothering food as claimed in claim 1, wherein said clearance existed between said inner pot and said thermal storage ring is from 0.5 cm to 1.5 cm.

4. A thermal cooker capable of boiling and smothering food as claimed in claim 2, wherein said thermal storage ring is kept from a bottom of said pans, skillets, etc. by a distance from 0.5 to 1.5 cm.

* * * * *